J. IRLMEIER, Jr.
TRACTOR COUPLING.
APPLICATION FILED JULY 10, 1918.
1,304,055.
Patented May 20, 1919.
2 SHEETS—SHEET 2.
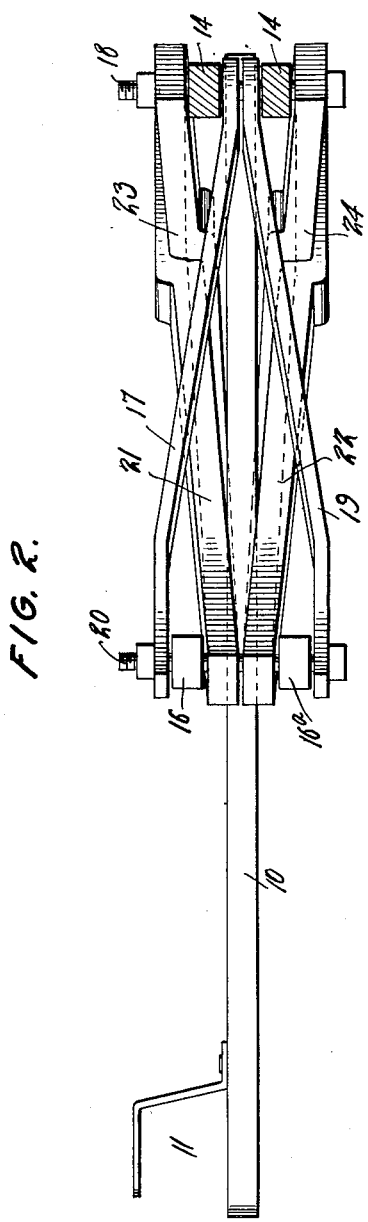
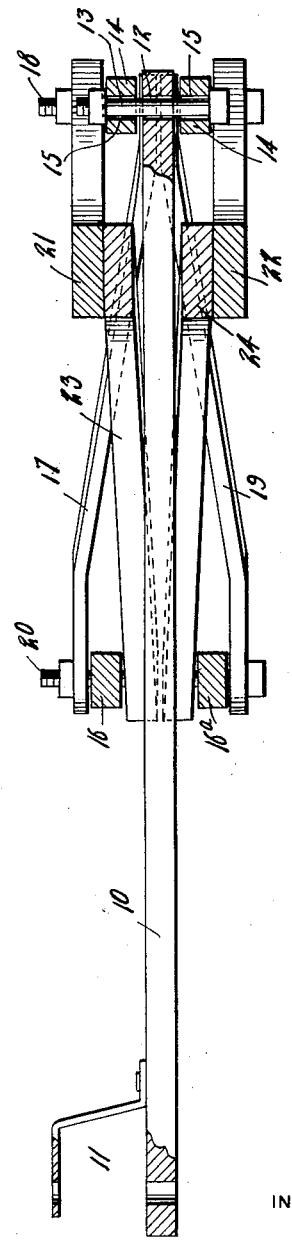
INVENTOR
Joseph Irlmeier Jr.
WITNESSES
BY
ATTORNEY

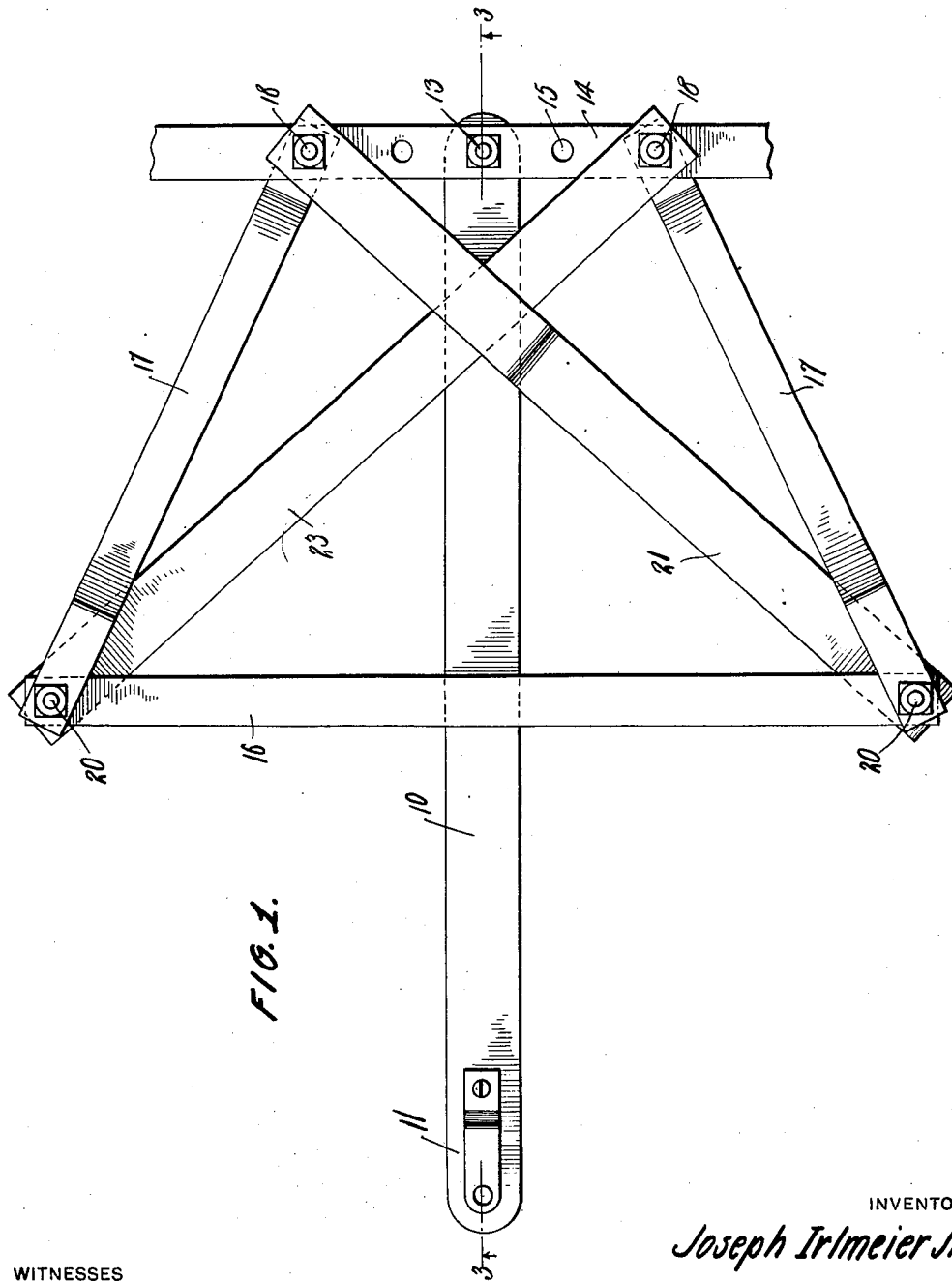

UNITED STATES PATENT OFFICE.

JOSEPH IRLMEIER, JR., OF TEMPLETON, IOWA.

TRACTOR-COUPLING.

1,304,055.                   Specification of Letters Patent.      Patented May 20, 1919.

Application filed July 10, 1918. Serial No. 244,281.

*To all whom it may concern:*

Be it known that I, JOSEPH IRLMEIER, Jr., a citizen of the United States, residing at Templeton, in the county of Carroll and State of Iowa, have invented certain new and useful Improvements in Tractor-Couplings, of which the following is a specification.

This invention relates to draft devices for tractors and has for its object to provide a simple draft connection between a tractor and a trailer which will insure proper tracking by the trailer and cause the latter, particularly when in the form of a plow or a gang of plows, to turn short corners.

With this object in view, together with others which will appear as the description proceeds, the invention resides in the novel formation, combination and arrangement of parts, all as will be described more fully hereinafter, particularly pointed out in the claim, and illustrated in the accompanying drawings, in which:

Figure 1 is a plan view of the improved tractor hitching device.

Fig. 2 is a side elevation of the same, and

Fig. 3 is a longitudinal sectional view on the line 3—3 of Fig. 1.

In the drawings, 10 indicates a draft bar having on one end a hammer strap 11 for the attachment of a vehicle or trailer to be drawn. In the opposite end of the bar 10 is a perforation 12 through which a coupling bolt 13 passes for pivotally connecting the draft bar 10 to the tractor. In the present instance, the draft bar 10 is inserted between two transverse beams 14 forming a part of the tractor and the coupling pin passed through these beams and the draft bar. Preferably, the beams 14 are arranged one above the other transversely of the tractor and each provided with a longitudinal series of alined perforations 15 for the coupling bolt 13 so that the point of attachment of the draft bar 10 may be varied to suit conditions.

At a suitable distance in the rear of the tractor and lying parallel with the beams 14 thereon, are two horizontal beams 16 and 16$^a$ extending one immediately above the other, the space between said beams constituting a guide of sufficient length for free lateral movement of the draft bar 10. Upon each end of the upper beam 16 is placed one end of an inwardly inclined side bar 17, the two bars 17 extending forwardly and at an inclination toward the draft bar 10, to the tractor beams 14 between which their ends pass and to which these ends are bolted as at 18, each at one side of and a short distance from the coupling bolt 13. Below each bar 17 is a similar bar 19, the rear ends of which bars 19 extend under the horizontal beam 16$^a$ and are fastened to the ends thereof by the same bolts 20 which secure the ends of bars 17 to the beam 16. The side bars 17 and 19 on each side of the draft bar 10 are bent slightly so as to converge to bring their forward ends into contact to pass between the tractor beams 14 and both ends are fastened by a bolt 18.

Between the guide beams 16 and 16$^a$ and spacing them at one end are two brace bars 21 and 22, the former lying immediately above the latter and both being fastened at their rear ends to the beams 16, 16$^a$, and side bars 17, 19, by the bolt 20. The two brace bars 21, 22, extend across the central line of draft to the upper and under sides, respectively, of the tractor beams 14 to which they are connected by the bolt 18 on that side of the draft bar 10. The braces 21 and 22 are substantially in contact between the beams 16 and 16$^a$, but diverge therefrom as they pass toward the beams 14 and at their point of crossing the draft bar 10, the braces 21 and 22 are each given a short outward bend, the former in an upward direction and the latter in a downward direction, from which bends these braces extend horizontally to their connecting bolt 18. Fastened in like manner to the opposite ends of beams 16 and 16$^a$ by bolt 20 at that end, are two other diagonal brace bars 23 and 24, similar to bars 21, 22, which in turn extend across the draft bar 10 and the braces 21, 22 to the tractor beams 14 to the upper and under sides of which they are connected by the bolt 19 on that side of the machine. Like the braces 21 and 22, the braces 23 and 24 have similar short bends where they cross the draft bar 10 and the braces 21 and 22, these bends of the braces 21 and 23 which pass above the draft bar 10 interlocking them and serving to hold more rigidly the frame of which they form a part. In like manner the brace bars 22, 24 below the draft bar are interlocked.

Thus is constructed a tractor coupling wherein the guide made up of the two beams 16 and 16$^a$ is considerably longer than the distance between the front bolts 18, and said guide permits the lateral swing of the draft bar 10 so that the trailed vehicle may follow the tractor when a short corner is turned. It is obvious that so long a guide and the bolts at its extremities may not be successfully hitched to points on the tractor beam as near together as the two bolts 18, without crossing the braces; and yet these braces must be made in pairs to permit a free swing of the draft bar 10.

Having thus fully described my invention, what I claim as new and desire to secure by Letters Patent, is:

In a tractor coupling, the combination with a pair of tractor beams having spaced bolts connecting them, a pair of guide beams paralleling the tractor beams and connected at their extremities by rear bolts spaced a greater distance apart than the bolts through said tractor beams, a coupling bolt through the tractor beams midway between the front bolts, and the draft bar pivotally mounted on said coupling bolt and extending loosely through the guides between said rear bolts; of two pairs of side bars connecting the front bolts with the rear bolts respectively, the members of each pair diverging from each other toward the rear, and two pairs of braces whereof each pair extends from one front bolt obliquely across the draft bar to the opposite rear bolt, the members of one pair being spaced to permit the swing of the draft bar and the members of the other pair being spaced to admit the members of the first pair, the members of each pair diverging from each other toward the front.

In testimony whereof I affix my signature in presence of two witnesses.

JOSEPH IRLMEIER, Jr.

Witnesses:
AUGUST E. THIELEKE,
MICHE HANDLOS.